F. G. KOEHLER.
RESILIENT TIRE.
APPLICATION FILED APR. 7, 1913.
1,176,760.
Patented Mar. 28, 1916.
3 SHEETS—SHEET 1.
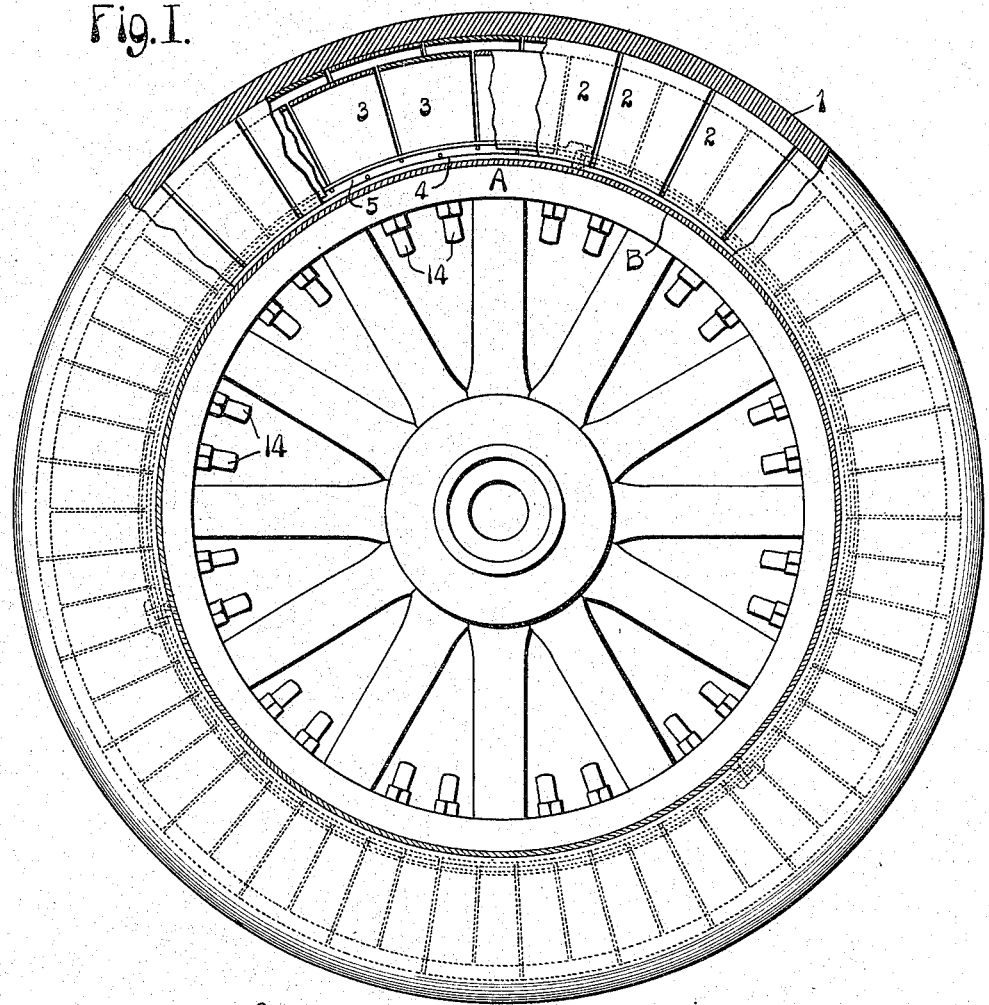
Fig. I.
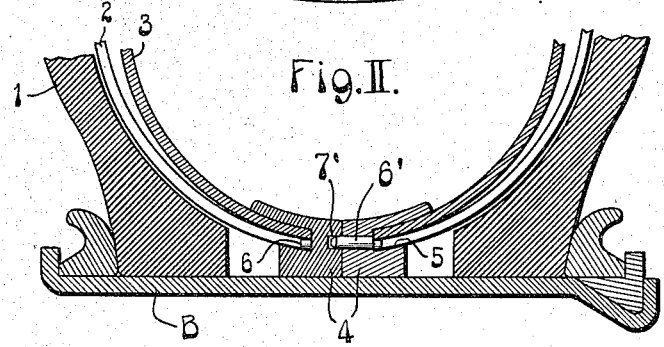
Fig. II.
Attest
Inventor:
F. G. Koehler
by Knight+Cook Att'ys.

F. G. KOEHLER.
RESILIENT TIRE.
APPLICATION FILED APR. 7, 1913.
1,176,760.
Patented Mar. 28, 1916.
3 SHEETS—SHEET 2.
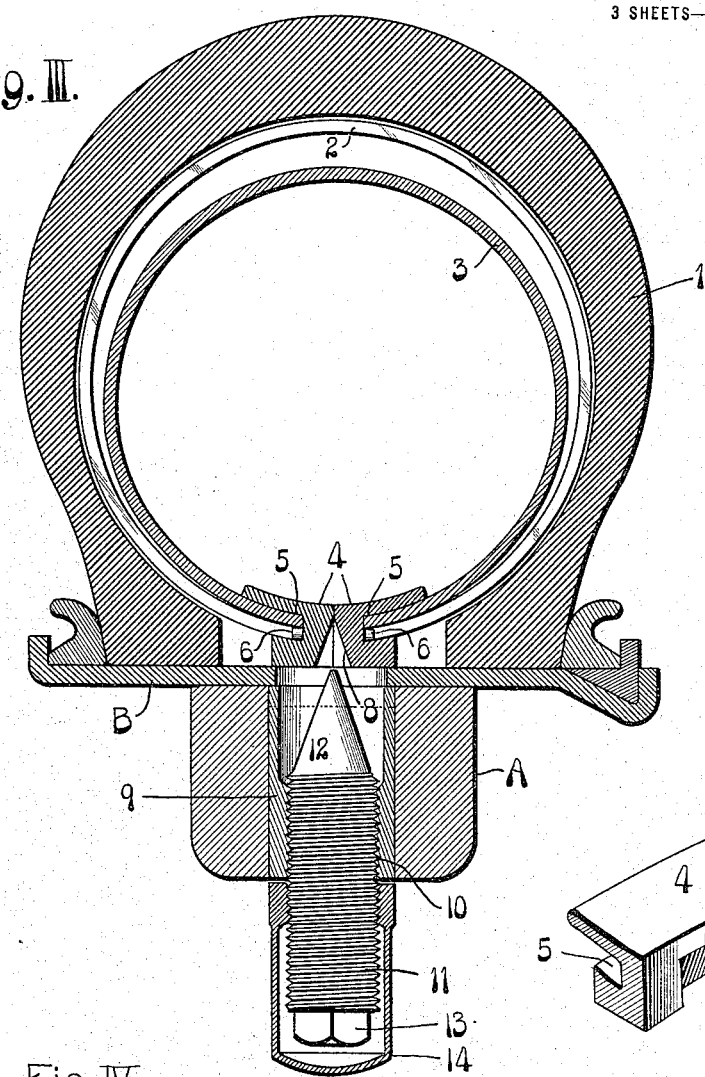
Fig. III.
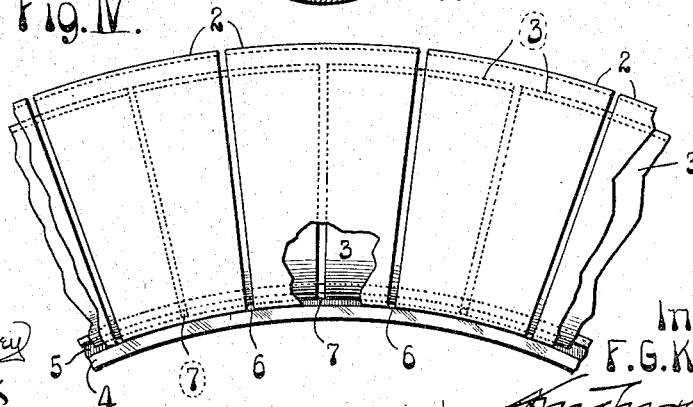
Fig. IV.     Fig. V.
Attest
a. J. McCauley
E. B. King
Inventor:
F. G. Koehler
by [signature] Atty's.
THE COLUMBIA PLANOGRAPH CO., WASHINGTON, D. C.

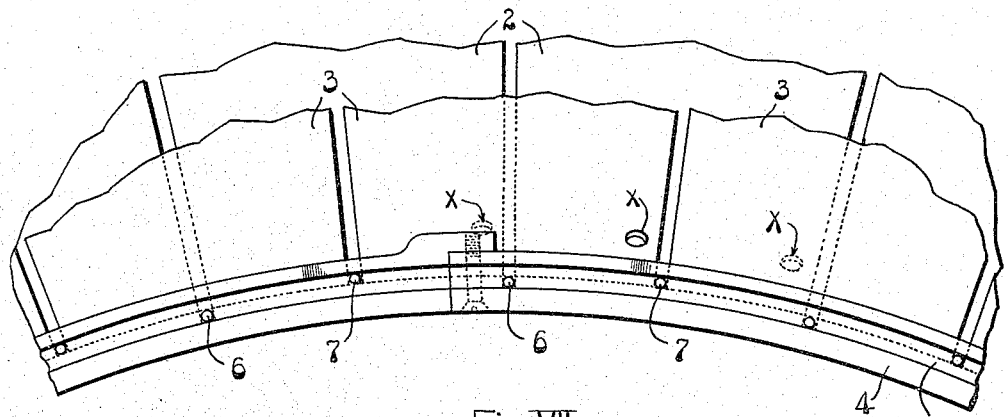
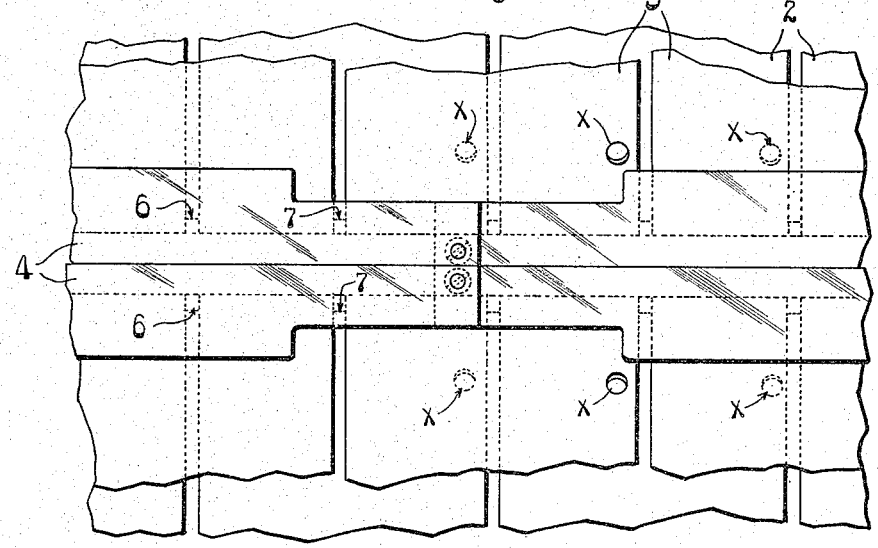
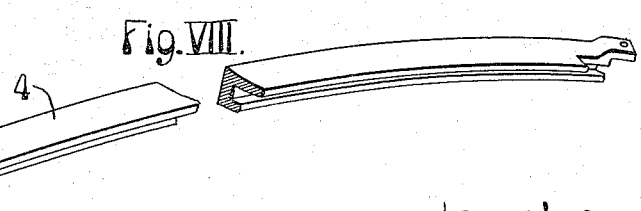

UNITED STATES PATENT OFFICE.

FRANK G. KOEHLER, OF ST. LOUIS, MISSOURI.

RESILIENT TIRE.

1,176,760.  Specification of Letters Patent.  Patented Mar. 28, 1916.

Application filed April 7, 1913. Serial No. 759,420.

*To all whom it may concern:*

Be it known that I, FRANK G. KOEHLER, a citizen of the United States of America, and a resident of the city of St. Louis and State of Missouri, have invented certain new and useful Improvements in Resilient Tires, of which the following is a full, clear, and exact description, reference being had to the accompanying drawings, forming a part of this specification.

My invention relates to a resilient tire for use on vehicle wheels, involving a casing, bow springs arranged in circular series within said casing, and means whereby the bow springs are expanded and distended toward the inner wall of the tread of the casing.

Figure I is a side elevation of a vehicle wheel with my resilient tire thereon, the tire being shown partly broken away and partly in section. Fig. II is an enlarged cross section through the inner portion of the tire and the rim on which the tire is mounted. Fig. III is an enlarged cross section through my tire, the rim and felly of the wheel on which it is mounted, and one of the spring expanding devices. Fig. IV is a side elevation of a plurality of the bow springs of my tire and one of the spreader rings, one of the outer bow springs being partly broken out to afford a view of portions of the inner bow springs. Fig. V is a perspective view of a fragment of one of the spreader rings, the view showing one of the seat portions engaged by the expanding devices. Fig. VI is an enlarged view illustrating the spreader rings in side elevation, and portions of the bow springs at the far side of the spreader rings, the view being taken at one of the joints of the spreader rings. Fig. VII is an enlarged view of the spreader rings and the end portions of the bow springs fitted to said spreader rings, taken looking toward the inner circle of the tire. Fig. VIII is a perspective view of one of the spreader ring sections, the central portion of the section being broken out.

In the accompanying drawings: A designates the felly of a vehicle wheel surrounded by a rim B, preferably of the demountable type. As no invention is herein claimed for the felly or rim to which my tire is applied, and they are of a well known type, it is deemed unnecessary to give further description of these parts.

1 designates the casing of my resilient tire secured to the rim B, which is preferably of the same construction as that common to pneumatic tires comprising an outer casing, and an inflatable tube located therein.

As hereinbefore indicated, my resilient tire comprises bow springs which are of service in lieu of inflatable inner tubes of pneumatic tires. There are two series of such bow springs, preferably in lapping relation, to wit: a series of outer bow springs 2, and a series of inner bow springs 3, the inner springs being arranged within the outer springs in such manner as to break joints between the latter, and being smaller than and, in order that the outer springs may be expanded to the inner wall of the tire casing, while the inner springs, also expanded, remain normally spaced from the outer springs. By this arrangement, the outer springs, being of larger dimensions, are more resilient, are presented to the tire casing in a manner to be first acted upon and yield when the tread of the tire is subjected to a limited degree of pressure or load, and if the pressure or load is such as not to be fully taken care of by the outer bow springs, the outer springs are brought into contact with the inner springs, which then become active to yieldingly resist the pressure or load.

One of the important features of my present invention is a provision of efficient means whereby the bow springs of my tire are expanded toward the tread of the tire to present them in proper relation to the tire casing and render them operative to the greatest degree of efficiency. The means for expanding the bow springs of my resilient tire comprises a pair of spreader rings 4, preferably sectional, which are positioned at the inner circle of the tire and are adjustable laterally relative to each other. These spreader rings have grooves 5, extending inwardly from their sides, into which the ends of the bow springs 2 and 3 enter, the grooves being of sufficient width to accommodate the overlapping springs; or, in other words, being of a width corresponding at least to the combined thickness of one of the outer bow springs 2 and one of the inner bow springs 3, so that each groove may be occupied by end portions of both the inner and outer bow springs when arranged in overlapping relation. In the grooves 5 are studs or distance pieces 6, (see Figs. II, III, VI and VIII), which serve to separate and properly position the outer bow springs 2, and in the same grooves are studs or distance pieces 7, that serve to separate and properly position the inner bow springs 3, the members 6 and 7 acting also to hold the springs from shifting after they are applied to the spreader rings.

In order that the spreader rings 4 may be properly positioned relative to each other previous to the application of the bow springs 2 and 3 thereto, I provide one of the rings with dowels 6', which enter into cavities 7' in the other and companion spreader ring, (see Fig. II).

To provide for the expansion of the bow springs 2 and 3 in accordance with my improvement, it is necessary to force the spreader rings 4 laterally and outwardly from each other, and this I accomplish by spreading devices about to be described, which are operable between the spreader rings. To permit the operation of the spreading device, the rings are provided at their inner and opposing walls with inclined cam faces 8, which converge toward the peripheries of the spreader rings, as seen most clearly in Fig. III, and provide V-shaped pockets.

The devices for forcing the spreader rings apart to expand the bow springs 2 and 3 comprise the following elements: 9 are bushings located in the felly A of the vehicle wheel, each bushing being provided with an internal screw thread 10, (see Fig. III). 11 are spreader screws operable in the bushings 9, in engagement with the screw threads 10, each screw being provided at its inner end with a conical point 12, which enters between the opposing inclined cam faces 8, when the screw is turned to move it outwardly from the position in which it is seen in Fig. III. At the inner end of each screw 11 is a head 13, to which a wrench, or other suitable implement, may be applied for the operation of the screw. The exposed portions of the spreader screws 11 extending beyond the fellies of the wheel are preferably normally incased by screw caps 14, fitted to said screws. It will be seen that the tire receiving rim B is perforated at the locations of the bushings 9 and the spreader screws operable therein, so that the points of the spreader screws may be adjusted through the rim to force the spreader rings 4 outwardly relative to each other in expanding the bow springs. It will also be understood that the spreader screws are located as frequently as may be most desirable, in order that the spreading action performed thereby may be accomplished most satisfactorily, and also in order that the spreader screws may be close enough together to furnish adequate backing members for the spreader rings when the latter are spaced apart.

To facilitate the introduction of the bow springs and spreader rings of my resilient tire into the casing 1, or the casing 1 over said parts, I preferably make each of said spreader rings of a plurality of sections, see Fig. I. By making the rings in sections, I am enabled to first assemble the inner and outer bow springs on the several ring sections after matching the latter together in pairs, and the matching pairs of ring sections are then joined at their ends, with the exception of a joint between the ends of two of the sections, previous to placing the tire casing to the bow springs and the spreader rings. It should be here stated that a gap in the series of bow springs is left at the location of the joint between the ring sections to be last connected, and this gap is finally filled by bow springs similar to the other bow springs after the casing is fitted over the springs and spreader rings. To facilitate the application of the bow springs last referred to, such springs are provided with perforations $x$ located near their ends and into which a suitable spreading implement may be introduced. These sections, seen in Figs. VI and VII, are introduced into the tire casing before the joint at the ends of the spreader ring sections last to be connected is made, and said sections are finally seated in the grooves in the spreader rings by spreading their ends, as described, and moving them inwardly through cutouts in the outer flanges of the spreader rings seen in Fig. VII. These springs are then readily adjusted in the grooves in the spreader rings.

I claim:

1. A resilient tire comprising, in combination with a wheel rim, a casing having edges fitted to said rim, bow springs within said casing having their terminal portions extended transversely of and substantially parallel with the periphery of the wheel rim, a pair of separable spreader rings in which the ends of said bow springs are fitted, and means for moving said spreader rings laterally relative to each other to expand said bow springs toward said casing.

2. A resilient tire comprising, in combination with a wheel rim, a casing having edges fitted to said rim, bow springs within said casing having their terminal portions extended transversely of and substantially parallel with the periphery of the wheel rim, a pair of spreader rings separable from each other transversely of the tire and having grooves in their outer side faces in which the ends of said bow springs are fitted, and means for moving said spreader rings laterally relative to each other to expand said bow springs toward said casing.

3. A resilient tire, comprising, in combination with a wheel rim, a casing having edges fitted to said rim, bow springs within said casing having their terminal portions extended transversely of and substantially parallel with the periphery of the wheel rim, a pair of spreader rings separable from each other transversely of the tire and having continuous grooves in their outer faces in which the ends of said bow springs are adjustably fitted, and means for moving said spreader rings laterally relative to each other to expand said bow springs toward said casing.

4. A resilient tire comprising a casing, bow springs within said casing, spreader rings provided with grooves in which the ends of said bow springs are seated, the said spreader rings being provided with distance pieces located in their grooves between which said bow springs seat, and means for moving one of said spreader rings laterally relative to the other to expand said bow springs.

FRANK G. KOEHLER.

In the presence of—
E. LINN,
M. FALVEY.

Copies of this patent may be obtained for five cents each, by addressing the "Commissioner of Patents, Washington, D. C."